United States Patent
Zekiecki

(10) Patent No.: US 11,591,063 B2
(45) Date of Patent: Feb. 28, 2023

(54) SEPARATING ELEMENT FOR A PLATFORM CABIN, PLATFORM COMPRISING SUCH AN ELEMENT AND METHOD FOR USING SUCH AN ELEMENT

(71) Applicant: DASSAULT AVIATION, Paris (FR)

(72) Inventor: Sebastien Zekiecki, Montigny le Bretonneux (FR)

(73) Assignee: DASSAULT AVIATION, Paris (FR)

( * ) Notice: Subject to any disclaimer, the term of this patent is extended or adjusted under 35 U.S.C. 154(b) by 863 days.

(21) Appl. No.: 16/456,055

(22) Filed: Jun. 28, 2019

(65) Prior Publication Data
US 2020/0407036 A1 Dec. 31, 2020

(51) Int. Cl.
*B64C 1/14* (2006.01)
*B64D 11/00* (2006.01)
*E05B 77/22* (2014.01)
*G07C 9/00* (2020.01)

(52) U.S. Cl.
CPC ........ *B64C 1/1438* (2013.01); *B64D 11/0023* (2013.01); *E05B 77/22* (2013.01); *G07C 9/00309* (2013.01)

(58) Field of Classification Search
CPC ... B64C 1/1438; B64C 1/1423; B64C 1/1469; B64D 11/0023; E05B 77/22
See application file for complete search history.

(56) References Cited

U.S. PATENT DOCUMENTS

| | | | | |
|---|---|---|---|---|
| 3,857,197 A | * | 12/1974 | Reddy | E05F 15/40 105/341 |
| 4,911,219 A | * | 3/1990 | Dalrymple | B61D 19/003 160/202 |
| 4,989,808 A | * | 2/1991 | Spraggins | B64C 1/1438 244/129.5 |
| 6,186,444 B1 | * | 2/2001 | Steel | B64D 11/0023 160/214 |
| 9,260,175 B2 | * | 2/2016 | Cabourg | E05C 17/60 |
| 10,252,809 B2 | * | 4/2019 | Cabourg | B64C 1/1438 |
| 10,316,572 B2 | * | 6/2019 | Leitmann | E05F 15/643 |

(Continued)

FOREIGN PATENT DOCUMENTS

| | | | | |
|---|---|---|---|---|
| FR | 2978121 | A1 | 1/2013 | |
| FR | 3073818 | A1 * | 5/2019 | ........... B64C 1/1438 |
| FR | 3073818 | A1 | 5/2019 | |

*Primary Examiner* — Joshua J Michener
*Assistant Examiner* — Arfan Y. Sinaki
(74) *Attorney, Agent, or Firm* — Davidson, Davidson & Kappel, LLC

(57) ABSTRACT

A separating element for a platform cabin comprises at least one leaf subjected to a return force toward its open position, and, for the or each leaf, a return member for returning the leaf toward its closed position and comprising a first end articulated at an articulation point movable jointly with the leaf. This return member also comprises a second end mounted movably relative to the partition between an active position and an inactive position, such that when the leaf is open and the second end is in the active position, the return member exerts, on the leaf, a return force returning the leaf toward its closed position, and when the leaf is open and the second end is in the inactive position, the return member is in a second configuration in which it does not exert a force returning the leaf toward its closed position.

16 Claims, 8 Drawing Sheets

(56) References Cited

U.S. PATENT DOCUMENTS

| | | | | |
|---|---|---|---|---|
| 2009/0078824 A1* | 3/2009 | Osborne | ................ | E05D 15/56 |
| | | | | 244/119 |
| 2013/0019536 A1 | 1/2013 | Cabourg et al. | | |
| 2013/0020369 A1* | 1/2013 | Pie | ............................ | E05D 3/10 |
| | | | | 16/222 |
| 2013/0111835 A1* | 5/2013 | Harter | ..................... | E05F 15/00 |
| | | | | 49/324 |
| 2014/0117161 A1* | 5/2014 | Harter | ................ | B64D 11/0023 |
| | | | | 244/129.5 |
| 2015/0210373 A1* | 7/2015 | Guimont | ................ | B64D 25/00 |
| | | | | 244/129.5 |
| 2016/0144944 A1* | 5/2016 | Goings | ................ | E05F 11/54 |
| | | | | 244/129.5 |

\* cited by examiner

SEPARATING ELEMENT FOR A PLATFORM CABIN, PLATFORM COMPRISING SUCH AN ELEMENT AND METHOD FOR USING SUCH AN ELEMENT

The present disclosure relates to a separating element for a platform cabin, of the type comprising:
- at least one stationary partition, delimiting a passage defining a circulation axis within the cabin,
- at least one leaf, mounted movable along a plane transverse to the circulation axis between a closed position, in which it extends across the passage, and an open position, in which it is arranged at least partially away from the passage, the leaf being subject to a return force toward its open position, and
- for the at least one leaf, a return member for returning the leaf toward its closed position, said return member comprising a first end articulated at an articulation point movable jointly with the leaf.

The disclosure also relates to a platform comprising a cabin and, inside said cabin, such a separating element to divide the cabin into a first and a second compartment, and a method for using such a separating element.

Here and hereinafter, "platform" refers to an airplane or a boat, or more generally, any vehicle having an at least partially cylindrical enclosure.

BACKGROUND

Such separating elements are known. FR-A-2,978,121 for example describes a separating element of an aircraft cabin comprising two stationary partitions delimiting a circulation passage through the aircraft between them, and a door formed by a leaf. The leaf is mounted movably on one of the stationary partitions between a closed position, in which it extends across the passage, and an open position, in which it is arranged away from the passage, retracted inside the stationary partition. An articulation parallelogram makes it possible to guide the movement of part of the leaf between the open and closed positions of the leaf.

The separating element of FR-A-2,978,121 is motorized, so as to allow the opening and closing of the leaf by simple activation of a command. To that end, this separating element comprises a motorized actuator connected to the articulation parallelogram to drive the movement of the leaf between its open and closed positions. As a safety measure, in order to allow the movement of the leaf even in case of failure of the motor means or the power source, the motorized actuator is reversible: thus, the leaf can be moved manually in such an outage scenario.

SUMMARY OF THE INVENTION

New aeronautic safety standards provide that the interior doors on board airplanes must be able to open and lock in the stowed position from the cockpit, and that the pilots must be able to receive feedback on the open or closed status of these doors.

These new standards thus make it necessary to motorize interior doors, which have been manual until now. It is, however, desirable, for some of these interior doors to preserve a "normal" manipulation of the door that is manual, which is not allowed by the solution described in FR-A-2,978,121.

One aim of the invention is thus to make it possible to actuate an interior door of a platform both using a manual operating mode and using a motorized operating mode.

Another aim is to be able to switch easily between the manual and motorized operating modes.

To that end, a separating element of the aforementioned type is provided, wherein the return member comprises a second end mounted movably relative to the partition between an active position and an inactive position, such that:
- when the leaf is open and the second end is in the active position, the return member is in a working configuration in which it exerts, on the leaf, a return force returning the leaf toward its closed position, said return force toward the closed position being greater than or equal to the return force toward the open position, and
- when the leaf is open and the second end is in the inactive position, the return member is in a second configuration in which it does not exert a force returning the leaf toward its closed position, or it exerts a residual return force less than the return force toward the open position, the separating element further comprising a main motorized actuator to move the second end of the return member between its active and inactive positions.

According to specific embodiments of the invention, the separating element also has one or more of the following features, considered alone or according to any technically possible combination(s):
- the articulation point is connected to the leaf such that the distance of said articulation point in the inactive position has a constant variation direction during the movement of the leaf between its open and closed positions,
- the distance of said articulation point in the inactive position increases during the movement of the leaf from its open position to its closed position,
- the articulation point is able to occupy a first position when the leaf is in the closed position and a second position when the leaf is in the open position, said first position being at a greater distance from the inactive position than from the active position,
- the return member is compressed when its second end is in the active position and the leaf is open,
- the main actuator is able to move the second end of the return member between its active and inactive positions along a substantially rectilinear path,
- the separating element comprises an opening sensor to detect when the leaf is in the open position,
- the separating element comprises a control module to control the main actuator, said control module being configured to command the movement of the second end of the return member toward its active position when the opening sensor detects that the leaf is in the open position,
- the partition has a free edge bordering the passage and along which the obstacle of the opening sensor is placed, said obstacle being separated from the movement plane of the leaf when it is in the retracted position and extending across the movement plane of the leaf when it is in the deployed position,
- the opening sensor comprises an obstacle movable relative to the partition between a retracted position and a deployed position, a motorized deployment actuator to move the obstacle from its retracted position to its deployed position, and a deployment sensor to detect when the obstacle is in the deployed position, the detection by the opening sensor of the open position of the leaf being subject to the detection, by the deployment sensor, of the fact that the obstacle is in the deployed position, and the separating element comprises a member movable jointly with the leaf so as to extend across the deployed position of the obstacle for any position of the leaf other than its open position, the separating element comprises a bolt to lock the leaf in its closed position, said bolt comprising:
- an obstruction movable relative to the partition between a locked position of the leaf, in which it is able to prevent the movement of the leaf from its closed position to its open position, and a released position of the leaf, in which it allows the leaf to move from its closed position to its open position, and
- a motorized unlocking actuator to move the obstruction from its locked position to its released position.

the return member is formed by a gas jack;

the separating element comprises a mechanism for guiding at least part of the leaf between the open and closed positions of the leaf, said guide mechanism comprising an articulation parallelogram; and the articulation parallelogram comprises a connecting rod articulated to a point secured to the leaf part, the articulation point of the first end of the return member being secured to said connecting rod.

A platform is also provided comprising a cabin and, inside said cabin, a separating element as defined above, said separating element dividing the cabin into a first and a second compartment.

According to one particular embodiment of the invention, the platform also has the following feature:
the platform consists of an aircraft, in particular an airplane.

A method for using a separating element as defined above is also provided, said method comprising the following steps:
providing the separating element, the leaf being in the closed position and the second end of the return member being in its active position,
first movement of the second end of the return member relative to the main actuator, so as to move said second end to its inactive position, and
jointly with said first movement, opening of the leaf, said leaf being driven by the first movement.

According to specific embodiments of the invention, the usage method also has one or more of the following features, considered alone or according to any technically possible combination(s):
the method comprises, after the first movement, the following additional steps:
locking the leaf in the open position, then
second movement of the second end of the return member relative to the main actuator, so as to move said second end to its active position, the leaf staying in the open position,
the method comprises, after the second movement, the following additional steps:
manual unlocking of the leaf, then
closing of the leaf at least partially under the effect of the return force toward the closed position exerted by the return member.

BRIEF SUMMARY OF THE DRAWINGS

Other features and advantages of the invention will appear upon reading the following description, provided solely as an example and done in reference to the appended drawings, in which.

DETAILED DESCRIPTION

Figure 1:
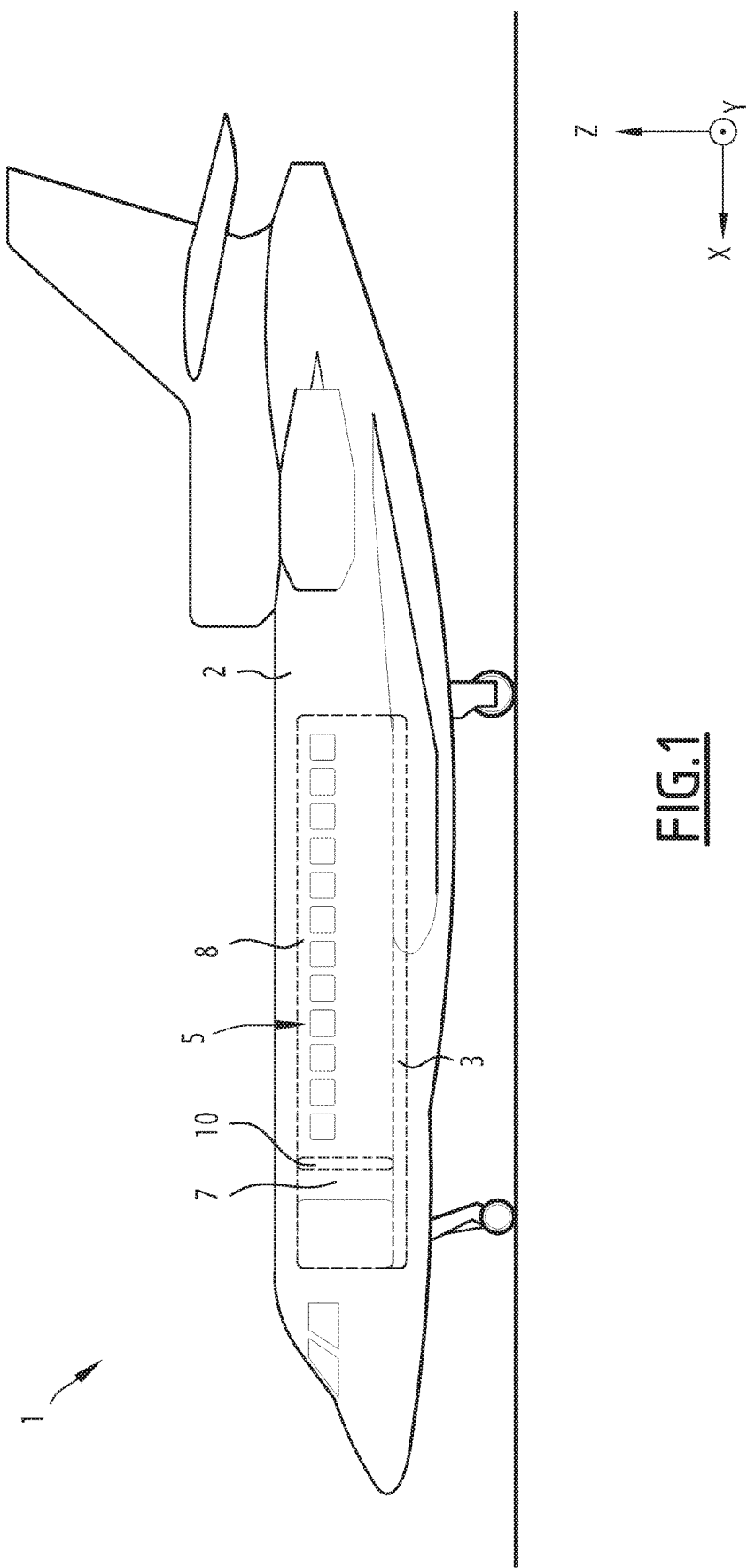
FIG. 1 is a schematic perspective view of a platform according to an exemplary embodiment of the invention.

The platform 1 shown in FIG. 1 consists of an aircraft, in particular an airplane. This platform 1 comprises, in a known manner, a fuselage 2 containing a floor 3 and inwardly delimiting, with said floor 3, a cabin 5 for transporting passengers.

Hereinafter, the orientation terms will be used in reference to the standard orientation coordinate system of an aircraft, shown in the Figures, in which one distinguishes:
a longitudinal axis X extending from the tail toward the nose of the aircraft and making up the direction of extension of the fuselage 2,
a transverse axis Y extending from the right to the left of the aircraft, for an observer facing the nose of the aircraft, and
a vertical axis Z extending from bottom to top,
the axes X and Y together defining a horizontal plane, the axes X and Z together defining a longitudinal plane, and the axes Y and Z together defining a transverse plane.

The platform 1 also comprises a separating element 10 installed inside the fuselage 2, between the fuselage 2 and the floor 3, transverse to the longitudinal direction X, said separating element 10 separating the cabin 5 into two compartments 7, 8.

Figure 2:
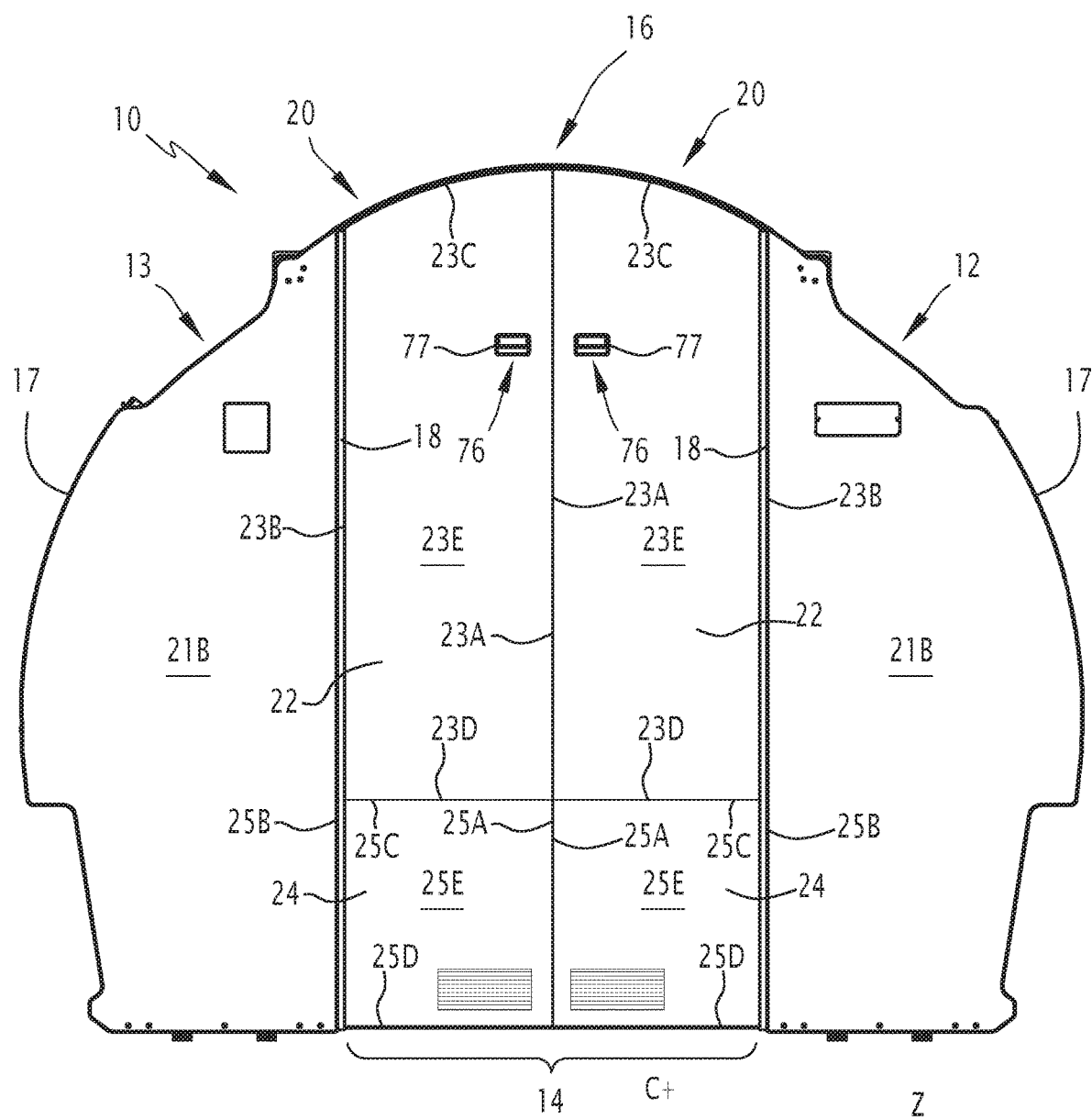
FIG. 2 is a rear elevation view of a separating element equipping the platform of FIG. 1.

In reference to FIG. 2, the separating element 10 has a width, defined horizontally, in the transverse plane, substantially equal to the inner diameter of the fuselage. In particular, the width is defined as being the greatest distance considered along the transverse axis Y separating two points of the separating element 10.

The separating element 10 comprises two stationary partitions 12, 13 delimiting a passage 14 between them, and a door 16 for selectively closing off the passage 14 or freeing the passage 14.

The passage 14 defines a circulation axis C inside the cabin, substantially combined with the longitudinal axis X.

Each partition 12, 13 has an edge 17 for connecting to the fuselage 2, and a free edge 18, opposite the edge 17, bordering the passage 14.

Figure 7:
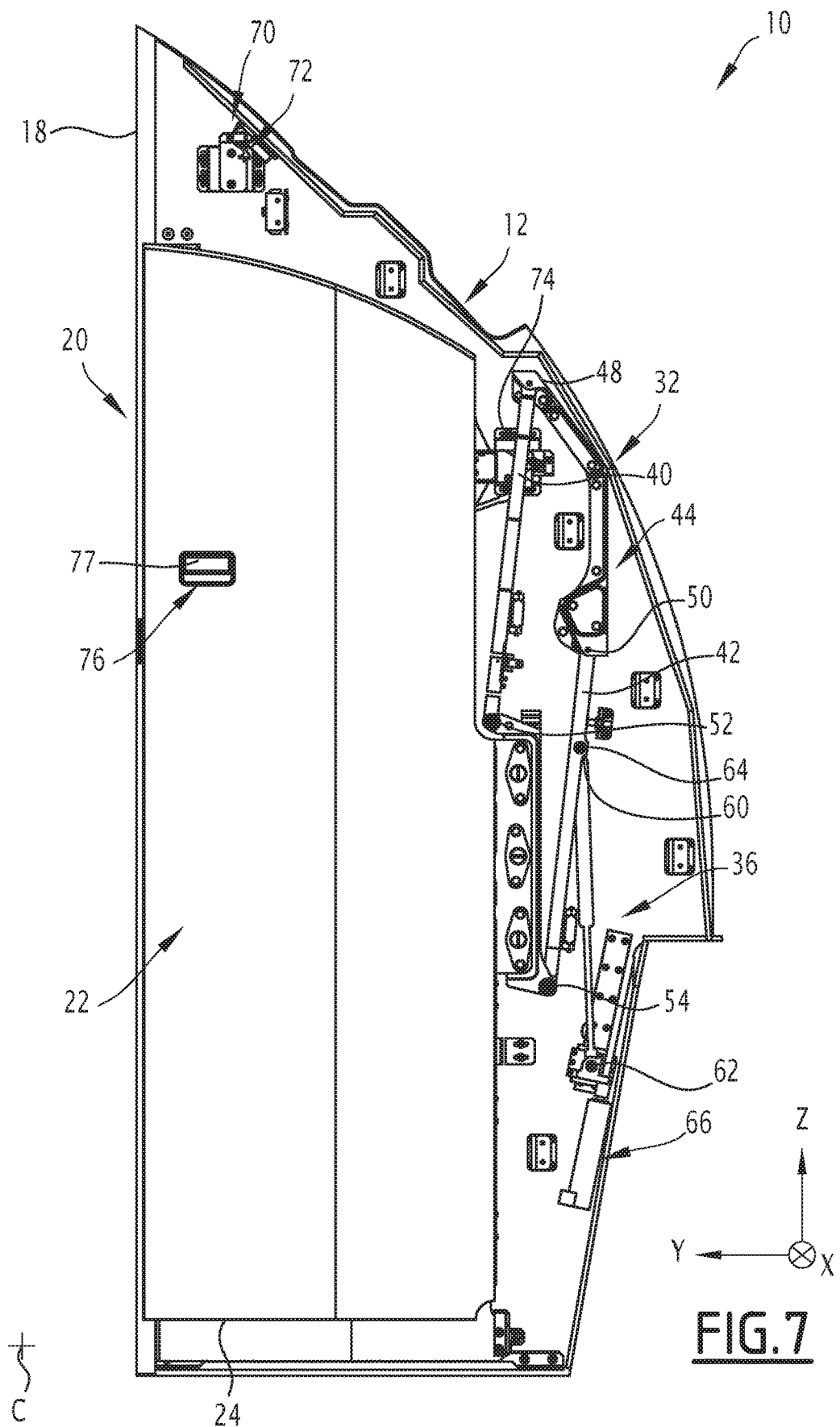
FIG. 7 is a view similar to that of FIG. 3, the leaf being in the open position and a member for returning the leaf to its closed position being in a released configuration.

The door 16 comprises two leaves 20, each leaf 20 being mounted movably on a respective partition 12, 13 between a closed position, shown in FIGS. 1 and 2, in which the leaf 20 extends across the passage 14, and an open position, shown in FIG. 7, in which it is arranged at a distance from the passage 14.

Each leaf 20 is suitable for moving along a transverse plane between its open and closed positions. In other words, each leaf 20 is suitable for being oriented perpendicular to the longitudinal axis X, and therefore in particular perpendicular to the circulation axis C, throughout its entire movement between its open and closed positions.

In particular, each stationary partition 12, 13 comprises a front partition panel 21A (FIG. 3) and a rear partition panel 21B (FIG. 2) defining a space between them for receiving the leaf 20 in the open position.

Furthermore, each leaf 20 comprises a first upper leaf part 22 and a second lower leaf part 24. The first leaf part 22 here is arranged vertically above the second leaf part 24 and will therefore be described hereinafter as upper leaf part, the second leaf part 24 making up a lower leaf part. In a variant, the first leaf part 22 makes up a lower part of the leaf 20, and the second leaf part 24 makes up an upper part of the leaf 20.

Each leaf part, respectively 22, 24, comprises an inner lateral edge, respectively 23A, 25A, oriented toward the center of the passage 14, an outer lateral edge, respectively 23B, 25B, oriented toward the respective partition 12, 13, an upper edge 23C, 25C, a lower edge, respectively 23D, 25D, a front face and a rear face, respectively 23E, 25E (FIG. 2).

The two leaf parts 22, 24 are mounted vertically movably relative to one another, as is described in document FR-A-2,978,121. Advantageously, the two leaf parts 22, 24 are also mounted movably transversely relative to one another, so as to allow the vertical alignment of the inner lateral edges 23A, 25A when the leaf 20 is in the closed position, as is also described in document FR-A-2,978,121.

The description continues with the description of only the right half of the separating element 10. This description also applies to the left half, the orientation terms "left" and "right" simply needing to be inverted, the term "trigonometric" having to be replaced by "clockwise", and the reference 12 by the reference 13.

Figure 3:
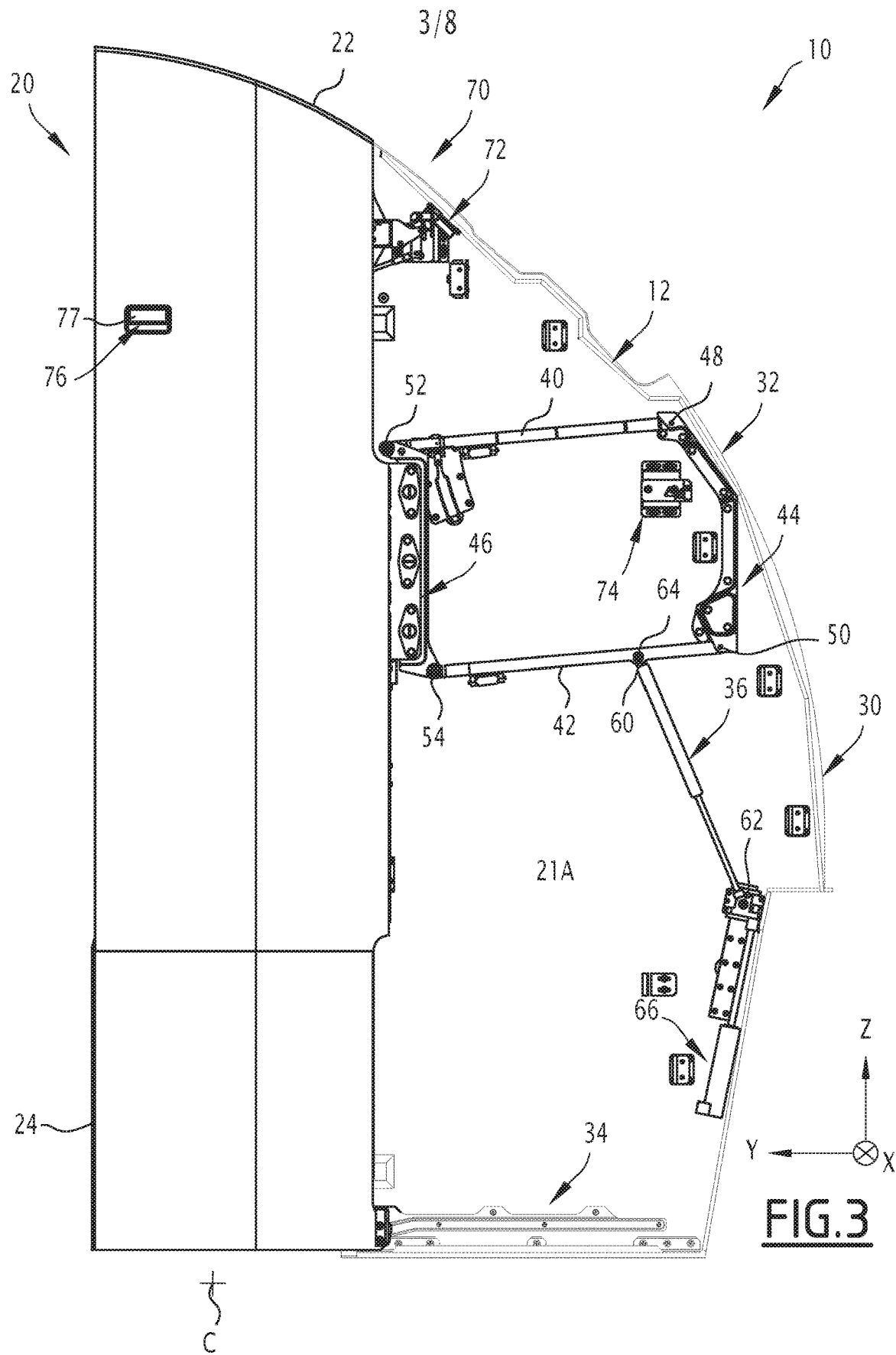
FIG. 3 is a rear partial sectional elevation view of half of the separating element of FIG. 1, a leaf of the separating element being in the closed position.

In reference to FIG. 3, the separating element 10 also comprises a system 30 for moving the leaf 20 relative to the partition 12. This movement system 30 comprises a mechanism 32 for guiding the first leaf part 22 between the open and closed positions of the leaf 20, a rail 34 for guiding the second leaf part 24 between the open and closed positions of the leaf 20, and a member 36 for returning the leaf 20 to its closed position.

The mechanism 32, respectively the rail 34, is suitable for guiding the movement of the first leaf part 22, respectively of the second leaf part 24, in translation inside the horizontal plane.

To that end, the mechanism 32 is, in the illustrated example, made up of a parallelogram articulating the first leaf part 22 to the partition 12.

This articulation parallelogram 32 comprises two guide connecting rods 40, 42, a main articulation device 44 for articulating each connecting rod 40, 42 to the partition 12, and a secondary articulation device for articulating each connecting rod 40, 42 to the first leaf part 22.

The main articulation device 44 is secured to the partition 12. It comprises a first primary articulation point 48 to a first connecting rod 40 of the connecting rods, and a second primary articulation point 50 to the second connecting rod 42. It is typically formed by a main fitting.

In the illustrated example, the first connecting rod 40 is arranged above the second connecting rod 42 and thus forms an upper connecting rod, the second connecting rod 42 making up a lower connecting rod.

The secondary articulation device 46 is secured to the first leaf part 22. It comprises a first secondary articulation point 52 to the first connecting rod 40, and a second secondary articulation point 54 to the second connecting rod 42. It is typically formed by a second fitting.

The main articulation points 48, 50 are spaced apart from one another and are kept immobile relative to one another by the main articulation device 44. Likewise, the secondary articulation points 52, 54 are spaced apart from one another and are kept immobile relative to one another by the secondary articulation device 46.

Each connecting rod 40, 42 is articulated at the main articular points 48, 50 so as to be rotatable around a longitudinal axis relative to the main articulation device 44. Likewise, each connecting rod 40, 42 is articulated at the secondary articular points 52, 54 so as to be rotatable around a longitudinal axis relative to the secondary articulation device 46.

The mechanism 32 being an articulation parallelogram, the connecting rods 40, 42 are substantially parallel to one another and are suitable for staying substantially parallel during the movement of the leaf 20 from its open position to its closed position. To that end, the distance between the main articulation points 48, 50 is substantially equal to the distance between the secondary articulation points 52, 54 and the distance between the first main and secondary articulation points 48, 52 is substantially equal to the distance between the second main and secondary articulation points 50, 54.

Thus, the articulation points 48, 50, 52, 54 form the four apices of a parallelogram, and the movement of the first leaf part 22 between the open and closed positions of the leaf 20 is a translation in an arc of circle inside a transverse plane.

In the illustrated example, the articulation points 48, 50, 52, 54 are connected to the ends of each connecting rod 40, 42, the lengths of said connecting rods 40, 42 being substantially equal.

Furthermore, still in the illustrated example, the position of the first leaf part 22 when the leaf 20 is open is lower than the position occupied by the same leaf part 22 when the leaf 20 is closed. As a result, the weight of the first leaf part 22 tends spontaneously to return the leaf 20 to its open position, and thus constitutes a return force returning the leaf 20 to its open position.

The guide rail 34 is substantially rectilinear and extends substantially horizontally. It is secured to the partition 12. It is suitable for cooperating with a guided member of the second leaf part 24 in order to guide said leaf part 24 along the transverse axis Y.

The return member 36 comprises a first end 60 and a second end 62 and is able to occupy a released configuration when the first and second ends 60, 62 are at a distance from one another substantially equal to a predetermined distance, and a compressed configuration when said first and second ends 60, 62 are at a distance from one another strictly smaller than said predetermined distance. When the return member 36 is in its compressed configuration, and for each intermediate configuration of the return member 36 between its compressed and released configurations, the return member 36 exerts, on its ends 60, 62, a return force toward the released configuration, said return force being transmitted to the elements to which said ends 60, 62 are connected.

The return member 36 is typically formed by a gas jack.

The first end 60 is articulated to an articulation point 64 movable jointly with the leaf 20. This articulation point 64 is in particular secured to one of the two connecting rods 40, 42, said connecting rod being, in the illustrated example, made up of the lower connecting rod 42.

Figure 8:
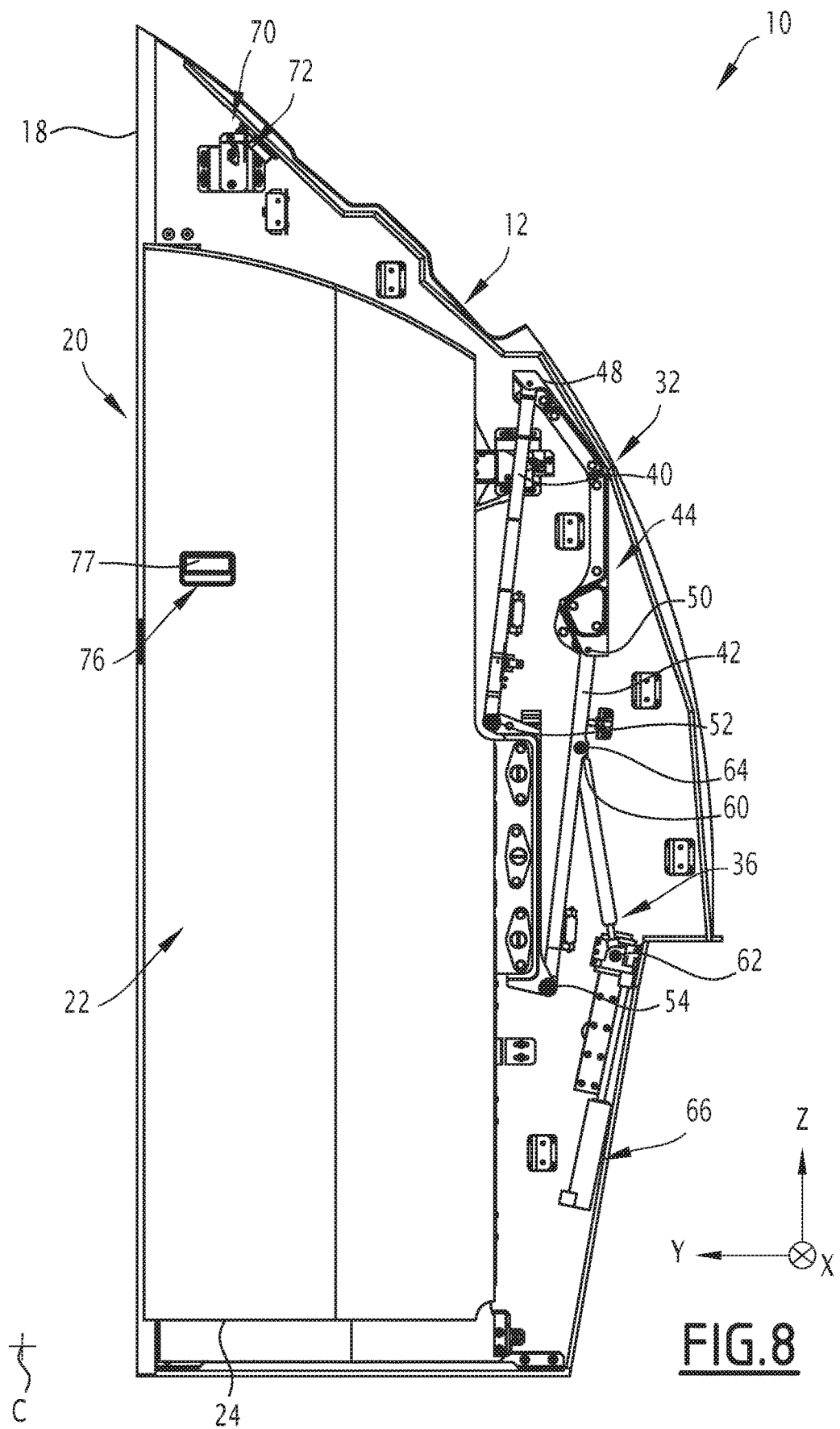
FIG. 8 is a view similar to that of FIG. 7, the return member of the leaf being in a working configuration.

The articulation point 64 is able to occupy a first position when the leaf 20 is in the closed position (see FIG. 3), and a second position when the leaf 20 is in the open position (see FIGS. 7 and 8). Said second position is laterally offset away from the passage 14 relative to said first position, i.e., the segment connecting the second position to the circulation axis C is intersected by the longitudinal plane passing through the first position.

The second end 62 in turn is able to occupy, relative to the partition 12, an active position such that, when said second end 62 is in said active position:
- for each position of the leaf 20 between its open and closed positions, the return member 36 is in a working configuration in which it exerts, on the leaf 20, a force returning the leaf 20 to its closed position, and
- when the leaf 20 is open, the return force to the closed position is greater than the return force to the open position, said return force to the open position here being made up, as a reminder, of the weight of the first leaf part 22.

Preferably, said return force to the closed position is greater than the return force to the open position for each position of the leaf 20 between its open and closed positions. In a variant, the return force to the closed position is:
- greater than the return force to the open position for each position of the leaf 20 between its open position and an intermediate position between the open and closed positions, and
- less than the return force to the open position for each position of the leaf 20 between its intermediate position and the closed position.

In FIGS. 3 and 8, the second end 62 is shown occupying said active position.

The return member 36 here is mounted such that its working configuration is made up of its compressed configuration. To that end, the active position is located such that, for each position of the leaf 20 between its open and closed positions, the distance of the articulation point 64 from said active position is less than the predetermined distance between the first and second ends 60, 62 of the return member 36 when said member 36 is released. Thus, the first and second positions of the articulation point, in particular, are at a distance from the active position smaller than said predetermined distance.

The return member 36 is also mounted such that, when its second end 62 is in its active position, the return force toward the closed position, exerted by the return member 36 on the leaf 20, is maximal when the leaf 20 is open. To that end, the active position is located so as to be at a greater distance from the first position of the articulation point 64 than the second position.

According to an exemplary embodiment of the invention, the second end 62 is also able to occupy, relative to the partition 12, an inactive position in which, when the leaf 20 is open, the return member 36 is in a second configuration in which it does not exert a return force returning the leaf 20 toward its closed position, said second configuration here being made up of the released configuration. In a variant, the return member 36 also exerts, when it is in its second configuration, a residual return force returning the leaf 20 toward its closed position, said residual return force being lower than the return force toward the open position; the second configuration is then made up of a configuration of the return member 36 intermediate between its compressed and released configurations.

The second end 62 is in particular mounted movably relative to the partition 12 between said active and inactive positions.

In FIG. 7, the second end 62 is shown occupying said inactive position.

This inactive position is located such that the distance of the articulation point 64 from said inactive position has a constant direction of variation during the movement of the leaf 20 between its open and closed positions, and in particular increases during the movement of the leaf 20 from its open position to its closed position and decreases during the movement of the leaf 20 from its closed position to its open position. Thus, said inactive position is at a greater distance from the first position of the articulation point 64 than the second position.

This inactive position is also located such that the distance of the second position of the articulation point 64 from said inactive position is substantially equal to, or less than, the predetermined distance between the ends 60, 62 of the return member 36 when it is in the released configuration.

The inactive position is also located such that, for each position of the leaf 20 between its open and closed positions, the articulation point 64 is at a greater distance from the inactive position than the active position. Thus, the first and second positions of the articulation point 64, in particular, are each at a greater distance from the inactive position than the active position.

Lastly, the inactive position is laterally offset away from the passage 14 relative to the second position of the articulation point 64, i.e., the segment connecting said inactive position to the circulation axis C is intersected by the longitudinal plane passing through the second position of the articulation point 64.

Returning to FIG. 3, in order to adjust the position of the second end 62 of the return member 36 between its active and inactive positions, the movement system 30 also comprises a main motorized actuator 66 in order to move said second end 62 between its active and inactive positions.

This main motorized actuator 66 is in particular able to move the second end 62 between its active and inactive positions along a substantially rectilinear path.

The main motorized actuator 66 is typically made up of a pin system with balls.

Still in reference to FIG. 3, the separating element 10 also comprises a system 70 for locking the leaf 20 in open and closed positions. This locking system 70 comprises a movable locking member secured to the leaf 20, two stationary locking members 72, 74 secured to the partition 12, and a device 76 for manually actuating the movable locking member.

The movable locking member and the actuating device 76 are typically identical to those described in FR-A-2,978,121. The actuating device 76 in particular comprises an actuating handle 77, accessible by the front and rear faces 23E, 25E of the leaf part 22, and a release button 78 (FIGS. 9 and 10), placed on the inner lateral edge 23A of the leaf part 22, in its rim, and accessible by said rim.

The stationary locking members 72, 74 comprise a first stationary locking member 72 suitable for cooperating with the movable locking member in order to lock the leaf 20 in the closed position, and a second stationary locking member 74 suitable for cooperating with the movable locking member in order to lock the leaf 20 in the open position.

As shown in the Figures, the stationary locking members 72, 74 have identical structures oriented perpendicular to one another.

Figure 5:
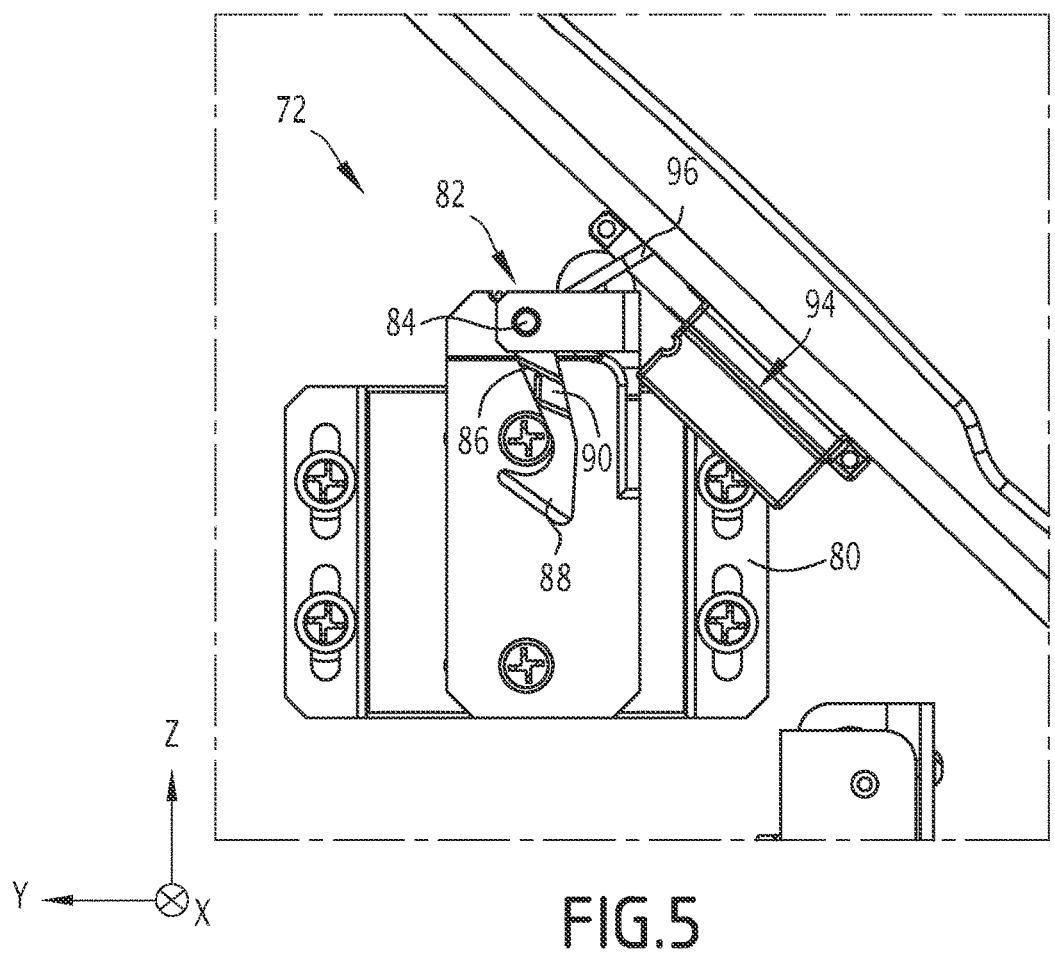
FIG. 5 is a view of a detail marked V in FIG. 4.

In reference to FIG. 5, each stationary locking member 72, 74 comprises a fastening platen 80 on the partition 12, an attachment member 82, articulated to the platen 80, and an articulation shaft 84 to the attachment member 82.

The platen 80, the attachment member 82 and the shaft 84 are identical for both stationary locking members 72, 74. The orientation of the platen 80 of the stationary locking member 72 differs, however, from that of the platen 80 of the stationary locking member 74. In particular, these orientations form an angle relative to one another substantially equal to 90°.

The attachment member 82 comprises a body 86, elongated in an extension direction of the attachment member 82 and having a first end 88, forming a hook, that is curved on a first side of the body 86, a fin protruding transversely from the body 86, and a projection 90 protruding longitudinally from the body 86. The attachment member 82 is suitable for pivoting on the shaft 84 between an idle position, in which the fin bears against a stop surface of the platen 80, and a retracted position, in which the fin is separated from the stop surface.

The first end 88 of the body 86 is suitable for cooperating with the finger of a lever of the movable locking member, as is described in FR-A-2,978,121, in order to lock the leaf 20 in the open or closed position when the attachment member 82 is in its idle position. Said first end 88 is also suitable for releasing said finger of the movable locking member when the attachment member 82 is in its retracted position, then allowing the movements of the leaf 20 between its open and closed positions.

The attachment member 82 thus forms a movable obstruction relative to the partition 12 between a locked position of the leaf 20, made up of its idle position, in which it blocks the leaf 20 in its closed or open position and prevents it from moving, and a released position of the leaf 20, made up of its retracted position, in which it allows the leaf 20 to move between its closed and open positions.

The projection 90 is in turn suitable for cooperating with a cam surface of said lever when said lever is in an unlocked position so as to urge the attachment member 82 toward its retracted position, as described in FR-A-2,978,121.

Each stationary locking member 72, 74 also comprises means for returning the attachment member 82 to its idle position. These return means are typically made up of a spring arranged around the shaft 84.

In its idle position, the attachment member 82 of the first stationary locking member 72 is oriented substantially vertically, opposite the passage 14. In its idle position, the attachment member 82 of the second stationary locking member 74 is oriented substantially horizontally, upward.

The first stationary locking member 72 further comprises a motorized unlocking actuator 94 in order to move the attachment member 82 from its idle position to its retracted position.

This motorized actuator 94 is suitable for exerting a force on the attachment member 82 of the first stationary locking member 72 so as to urge the attachment member 82 into its retracted position. In particular, the motorized actuator 94 is suitable for exerting said force on an appendage 96 of the attachment member 82, this appendage 96 protruding from the second end of the body 86, opposite the first end 88, toward the second side of the body 86. This force is oriented away from the first end 88 such that, under the effect of this force, the locking member 82 pivots around the shaft 84 toward its retracted position. This force opposes that exerted by the return means.

This motorized actuator 94 is preferably made up of a linear actuator.

Figure 4:
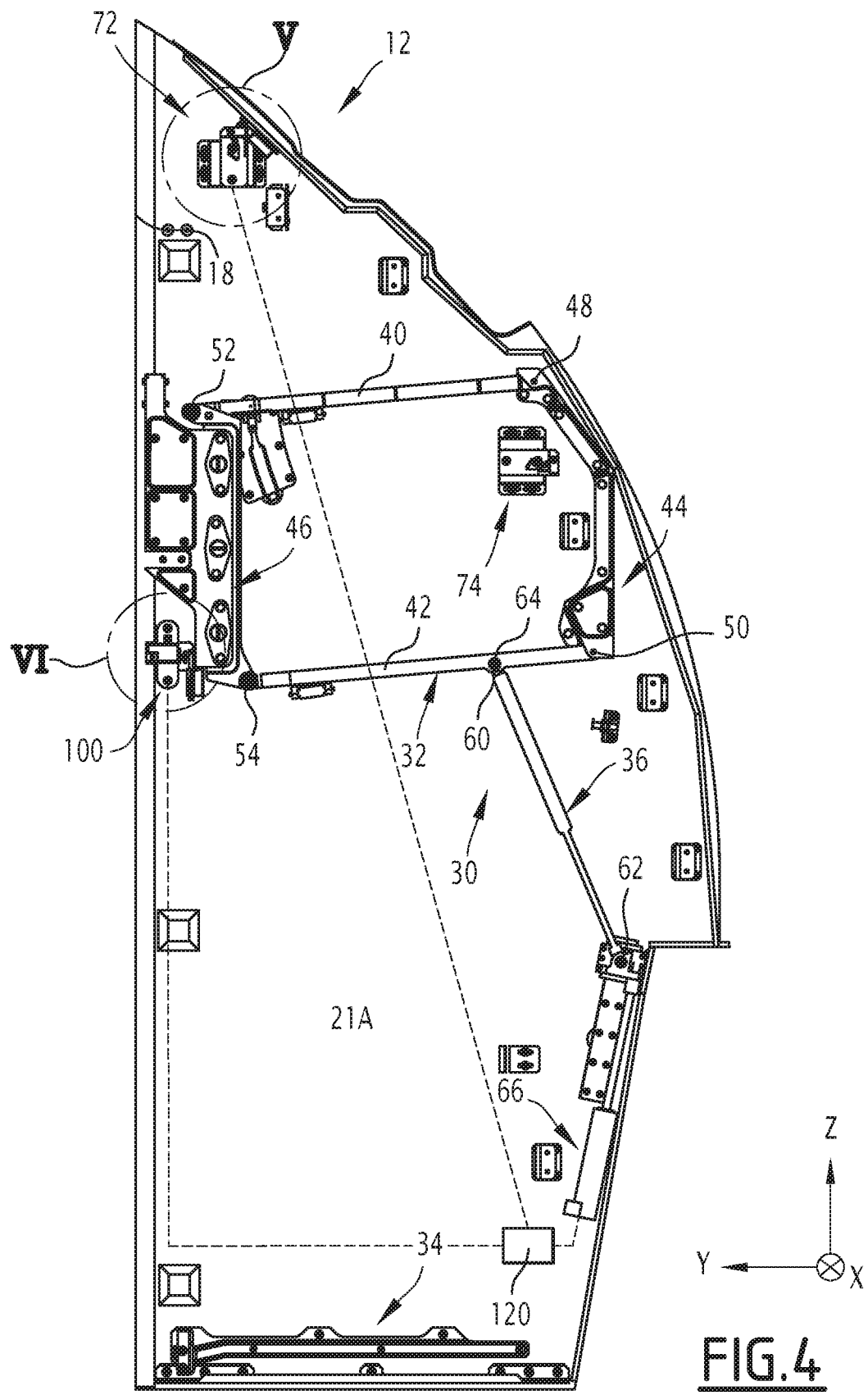
FIG. 4 is a view similar to that of FIG. 3, the leaf having been omitted.

In reference to FIG. 4, the separating element 10 further comprises an opening sensor 100, placed along the free edge 18 of the partition 12, to detect when the leaf 20 is in the open position.

Figure 6:
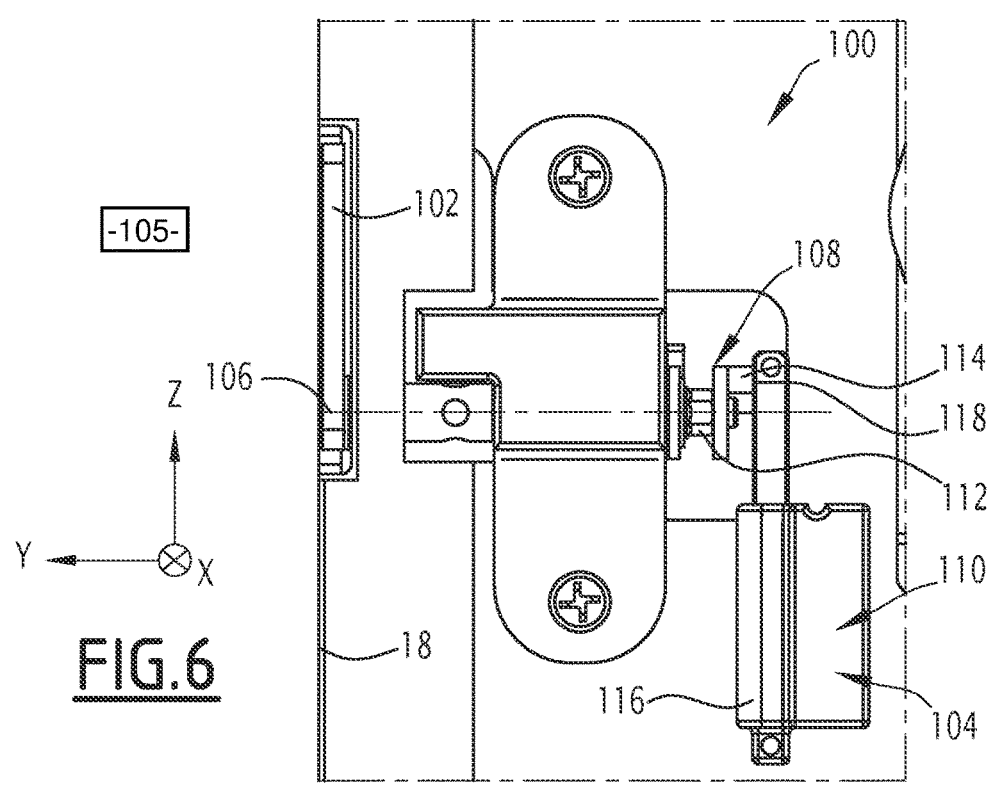
FIG. 6 is a view of a detail marked VI in FIG. 4.

In reference to FIG. 6, this opening sensor 100 comprises an obstacle 102 movable relative to the partition 12 between a retracted position and a deployed position, a motorized deployment actuator 104 to move the obstacle 102 from its retracted position to its deployed position, and a deployment sensor to detect when the obstacle 102 is in the deployed position.

Figure 9:
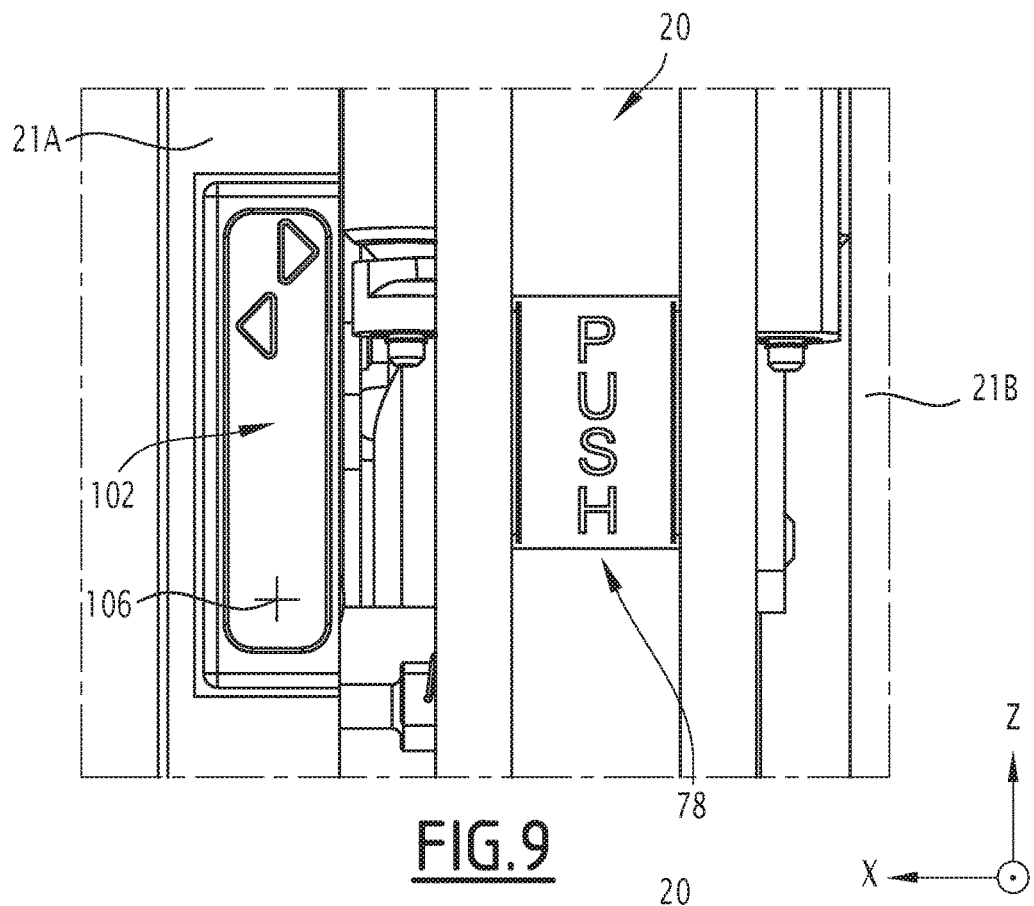
FIG. 9 is a side elevation view of the half of the separating element of FIG. 3, the leaf being in an open position and a locking member of the leaf being in a retracted position.
Figure 10:
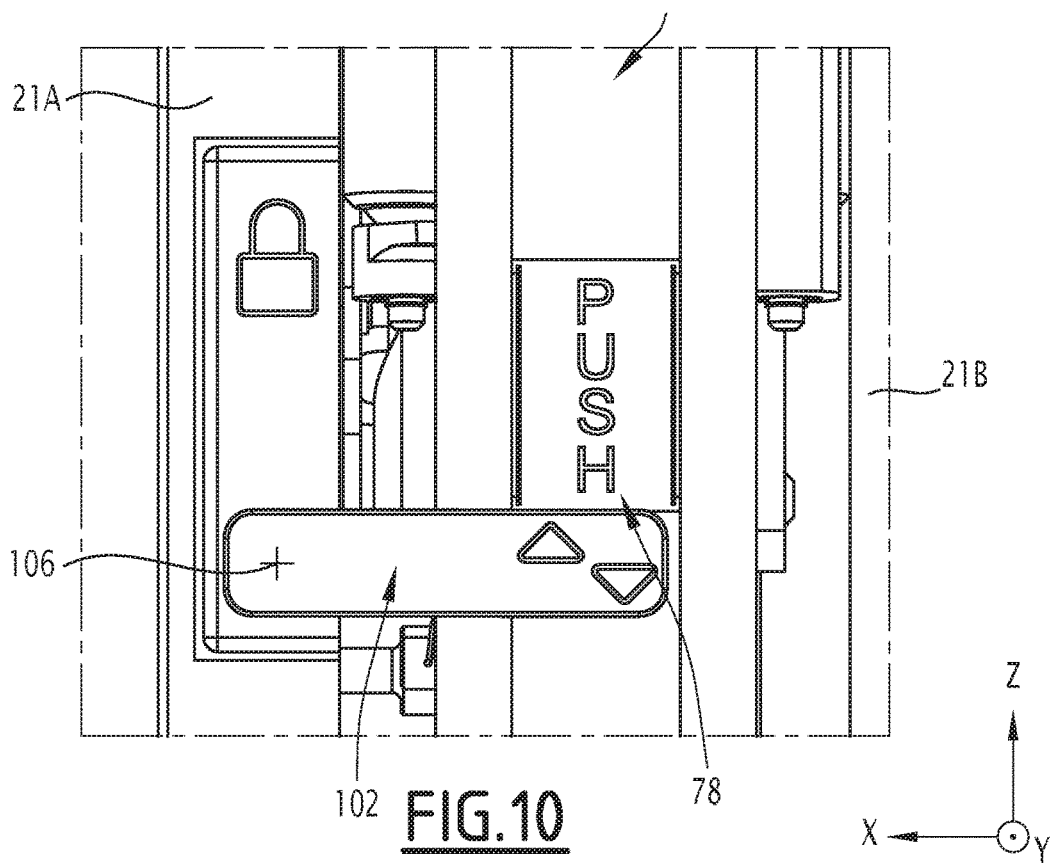
FIG. 10 is a view similar to that of FIG. 9, the locking member being in a deployed position.

In reference to FIGS. 9 and 10, the obstacle 102 is in particular formed by an arm flush with the free edge 18 of the partition 12 and mounted pivoting around a pivot axis 106 transverse to the partition 12 so as to be separated from the movement plane of the leaf 20 when the obstacle is in the retracted position, as shown in FIG. 8, and to extend across the movement plane of the leaf 20 when it is in the deployed position, as shown in FIG. 9. As a result, the leaf 20 extends across the deployed position of the obstacle for any position of the leaf 20 other than its open position.

Returning to FIG. 6, the motorized deployment actuator 104 is able to rotate the arm 102 around its pivot axis 106. To that end, this actuator 104 is, in the illustrated example, made up of a crank 108 and a motorized linear actuator 110.

The crank 108 is mounted rotatably around the axis 106 relative to the partition 12. It comprises a shaft 112 coaxial to the axis 106 and to which the arm 102 is secured, and a crank pin 114 that is off-centered relative to said axis 106.

The linear actuator 110 in turn comprises a body 116 secured to the partition 12, and a piston 118 driven, translatable relative to the partition 12, in a translation direction substantially comprised in a longitudinal plane and in particular substantially vertical. This piston 118 is secured to the crank pin 114 along said translation direction.

The deployment sensor is typically formed by an end of travel sensor of the motorized actuator 104, in particular of the motorized linear actuator 110.

The detection by the opening sensor 100 of the open position of the leaf 20 is subject to the detection, by the deployment sensor, of the fact that the obstacle 102 is in the deployed position. The leaf 20 preventing the deployment of the obstacle 102 when it is not in its open position, the detection of the deployed position of the obstacle 102 subsequently makes it possible to ensure that the leaf 20 is open. Furthermore, the detection of the deployed position of the obstacle 102 makes it possible to ensure that the leaf 20 is kept in its open position, since, when the obstacle 102 is deployed, it extends across the movement plane of the leaf 20 and therefore blocks the movements of the leaf 20.

Preferably, the detection by the opening sensor 100 of the open position of the leaf 20 is made up of the detection, by the deployment sensor, of the fact that the obstacle 102 is in the deployed position.

Returning to FIG. 4, the separating element 10 lastly comprises a control module 120 for controlling the actuators 66, 94 and 104.

This control module 120 is first configured to control the actuator 94 to retract the attachment member 82 of the first stationary locking member 72 when the control module 120 receives an order to open the door 16.

Next, the control module 120 is configured to command the main actuator 66 to move the second end 62 of the return member 36 toward its inactive position when it receives, from the actuator 94, information according to which said attachment member 82 of the first stationary locking member 72 is retracted.

The control module 120 is next configured to command the actuator 104 to deploy the obstacle 102 when it receives, from the main actuator 66, information according to which said second end 62 of the return member 36 is in its inactive position.

The control module 120 is lastly configured to command the main actuator 66 to move the second end 62 of the return member 36 toward its inactive position when it receives, from the opening sensor 100, information according to which the obstacle 102 is deployed.

Advantageously, the separating element 10 also comprises a device for adjusting the position of the leaf 20 relative to the mechanism 32 and means for limiting the travel of the leaf 20 in the circulation direction C. This adjusting device and these limiting means are for example identical to those described in FR-A-2,978,121.

A method for using the separating element 10 will now be described, in reference to the Figures.

The door 16 is initially in its closed position, as shown in FIGS. 2 and 3, and the second end 62 of the return element 36 is in its active position. The control module 120 then receives an order to open the door 16. This opening order typically comes from the cockpit, for example from a voice command issued by one of the pilots of the airplane 1 or upon the actuation, by one of said pilots, of a button commanding the opening of said door 16.

When the control module 120 receives this opening order, it first sends a first command to the actuator 94 in order to retract the attachment member 82 of the first stationary locking member 72. The actuator 94 complies, then sends the control module 120 a first information item according to which said attachment member 82 of the first stationary locking member 72 is retracted.

Upon reception of this first information item, the control module 120 commands the main actuator 66 to deploy the second end 62 of the return member 36 toward its inactive position. The actuator 96 complies. This first causes the relaxation of the return member 36, until it reaches a configuration in which the return force that it exerts on the leaf 20 no longer manages to offset the weight of the second leaf part 22. The second leaf part 22 then begins to lower, bringing the second leaf part 24 with it toward the retracted position of the leaf 20. This movement thus continues until the leaf 20 has reached its open position, and the second end 62 of the return member 36 is in its inactive position. The actuator 96 then sends the control module 120 a second information item according to which said second end 62 of the return member 36 is in its inactive position.

Upon reception of this second information item, the control module 120 commands the actuator 104 to deploy the obstacle 102. The actuator 104 complies, thus locking the leaf 20 in its open position, then sends the control module 120 a third information item according to which the obstacle 102 is deployed.

Upon reception of this third information item, the control module 120 commands the main actuator 66 to move the second end 62 of the return member 36 toward its active position. The actuator 96 complies. The leaf 20 being kept in its open position in particular by the obstacle 102, the leaf 20 remains in the open position, and the return member 36 is compressed. At the end of this step, the return member 36 is in its working configuration, and the leaf 20 is ready to be closed manually.

Lastly, the leaf 20 is closed manually by a user. To that end, the user manually unlocks the leaf 20, first by pulling back the obstacle 102, then by pressing on the button 78. Once the leaf 20 is unlocked, it is driven to its closed position under the effect of the force exerted by the return member 36.

Owing to the exemplary embodiment of invention described above, it is thus possible to maneuver the door 16 both manually and in a motorized manner, and the fact that this door 16 is motorized is transparent for the user who uses it manually, the door 16 automatically returning to manual mode.

Thus, the exemplary embodiment of invention makes it possible to effectively reconcile the safety requirements of the new standards applicable to interior doors with the manual maneuverability needs of these doors.

Although in the example described above, the return member 36 is made up of a jack working in compression, the invention is not limited to this embodiment alone.

Thus, in a first variant embodiment of the invention that is not shown, the return member 36 works in extension instead of working in compression. The working configuration of the return member 36 is then made up of a tensed configuration of the return member 36, in which the first and second ends 60, 62 of said return member 36 are at a distance from one another strictly greater than the predetermined distance between the first and second ends 60, 62 of the return member 36 when said member 36 is released, the return member 36 exerting, on said end 60, 62, a return force toward the released configuration. To that end, the active position of the end 62 is located such that, for each position of the leaf 20 between its open and closed positions, the distance of the articulation point 64 from said active position is greater than said predetermined distance. Furthermore, the inactive position of the end 62 is located such that, for each position of the leaf 20 between its open and closed positions, the articulation point 64 is at a smaller distance from the inactive position than the active position.

Furthermore, in a second variant embodiment of the invention that is not shown, which can be combined with the first variant, the return member 36 is such that the predetermined distance between its ends 60, 62 when it is in the relaxed configuration is:

greater than the distance of the second position of the articulation point 64 in the inactive position when the return member 36 works in compression, and less than the distance of the second position of the articulation point 64 in the inactive position when the return member 36 works in extension.

The return member 36 is then suitable for occupying a reversed configuration relative to its working configuration, reversed configuration in which its ends 60, 62 are at a distance from one another substantially equal to the distance of the second position of the articulation point 64 in the inactive position, the return member 36 exerting, on said ends 60, 62, a force oriented in a direction opposite that of the force that it exerts on these ends 60, 62 when it is in the working configuration. To that end, the return member 36 is for example made up of a spring.

The second configuration of the return member 36 is then made up of said reversed configuration.

In a variant, in which the return member 36 also exerts, when it is in its second configuration, a residual return force returning the leaf 20 toward its closed position, said residual return force is equal to the return force toward the open position.

In general, as indicated above, the return force is the weight of the first leaf part 22, which tends spontaneously to return the leaf 20 to its open position. This return force is inherent to the separating element as described above and in this example does not require means other than the weight of the first leaf part 22 to be generated. Furthermore, this return force is exerted continuously, resulting from gravity.

The invention claimed is:

1. A platform cabin separator, comprising:
   at least one stationary partition, delimiting a passage defining a circulation axis within a cabin;
   at least one leaf, mounted movable along a plane transverse to the circulation axis between a closed position, in which the at least one leaf extends across the passage, and an open position, in which the at least one leaf is arranged at least partially away from the passage, the at least one leaf being subject to a return force toward the open position;
   for the at least one leaf, a return member for returning the at least one leaf toward the closed position, the return member comprising a first end articulated at an articulation point movable jointly with the at least one leaf, the return member comprising a second end mounted movably relative to the partition by being rotatable about an axis of rotation between an active position and an inactive position, the movement of the second end relative to the partition between the active and inactive positions resulting in a corresponding movement of the axis of rotation, such that:
      when the at least one leaf is open and the second end is in the active position, the return member is in a working configuration in which the return member exerts, on the at least one leaf, a return force returning the at least one leaf toward the closed position, the return force toward the closed position being greater than or equal to the return force toward the open position, and
      when the at least one leaf is open and the second end is in the inactive position, the return member is in a second configuration in which the return member does not exert a force returning the at least one leaf toward its closed position, or in which the return member exerts a residual return force less than or equal to the return force toward the open position; and
   a motorized main actuator to move the second end of the return member between the active and inactive positions.

2. The separator according to claim 1, wherein the articulation point is connected to the at least one leaf such that a distance separating the articulation point of the first end from the second end, when the second end is in the inactive position has a constant variation direction during the movement of the at least one leaf between the open and closed positions.

3. The separator according to claim 2, wherein the distance separating the articulation point of the first end from the second end, when the second end is in the inactive position increases during the movement of the at least one leaf from the open position to the closed position.

4. The separator according to claim 1, wherein the articulation point is configured to occupy a first position when the at least one leaf is in the closed position and a second position when the at least one leaf is in the open position, the first position being at a greater distance from the inactive position than from the active position.

5. The separator according to claim 1, wherein the return member is compressed when the second end of the return member is in the active position and the at least one leaf is in the open position.

6. The separator according to claim 1, wherein the main actuator is configured to move the second end of the return member between the active and inactive positions along a substantially rectilinear path.

7. The separator according to claim 1, further comprising an opening sensor to detect when the at least one leaf is in the open position.

8. The separator according to claim 7, further comprising a controller to control the main actuator, the controller being configured to control the movement of the second end of the return member toward the active position when the opening sensor detects that the at least one leaf is in the open position.

9. The separator according to claim 7, wherein the opening sensor comprises:
   an obstacle movable relative to the partition between a retracted position and a deployed position,
   a motorized deployment actuator to move the obstacle from the retracted position of the obstacle to the deployed position of the obstacle, and
   a deployment sensor to detect when the obstacle is in the deployed position,
   the detection by the opening sensor of the open position of the at least one leaf being subject to the detection, by the deployment sensor, of the obstacle being in the deployed position,
   the first end of the return member being movable jointly with the at least one leaf so the leaf extends across the deployed position of the obstacle for any position of the at least one leaf other than the open position.

10. The separator according to claim 1, comprising an attachment member to lock the at least one leaf in the closed position, the attachment member comprising:
    an obstruction movable relative to the partition between a locked position of the at least one leaf, in which the obstruction is configured to prevent the movement of the at least one leaf from the closed position to the open position, and a released position of the at least one leaf, in which the obstruction allows the at least one leaf to move from the closed position to the open position, and
    a motorized unlocking actuator to move the obstruction from the locked position to the released position.

11. A platform comprising a cabin and, inside the cabin, the separator according to claim 1, the separator dividing the cabin into a first and a second compartment.

12. A method for using a separator, comprising:
    providing the separator according to claim 1, the at least one leaf being in the closed position and the second end of the return member being in the active position;
    first moving of the second end of the return member relative to the main actuator, so as to move the second end to the inactive position; and
    jointly with the first moving, opening of the at least one leaf, the at least one leaf being driven by the first moving.

13. The method according to claim 12, further comprising, after the first moving:
    locking the at least one leaf in the open position; and then
    second moving of the second end of the return member relative to the main actuator, so as to move the second end to the active position, the at least one leaf staying in the open position.

14. The method according to claim 13, further comprising, after the second moving:
- manual unlocking of the at least one leaf; and then
- closing of the at least one leaf at least partially under the effect of the return force toward the closed position exerted by the return member.

15. A platform cabin separator, comprising:
- at least one stationary partition, delimiting a passage defining a circulation axis within a cabin;
- at least one leaf, mounted movable along a plane transverse to the circulation axis between a closed position, in which the at least one leaf extends across the passage, and an open position, in which the at least one leaf is arranged at least partially away from the passage, the at least one leaf being subject to a return force toward the open position;
- for the at least one leaf, a return member for returning the at least one leaf toward the closed position, the return member comprising a first end articulated at an articulation point movable jointly with the at least one leaf, the return member comprising a second end mounted movably relative to the partition between an active position and an inactive position, such that:
  - when the at least one leaf is open and the second end is in the active position, the return member is in a working configuration in which the return member exerts, on the at least one leaf, a return force returning the at least one leaf toward the closed position, the return force toward the closed position being greater than or equal to the return force toward the open position, and
  - when the at least one leaf is open and the second end is in the inactive position, the return member is in a second configuration in which the return member does not exert a force returning the at least one leaf toward its closed position, or in which the return member exerts a residual return force less than or equal to the return force toward the open position; and
- a motorized main actuator to move the second end of the return member between the active and inactive positions,
- wherein the articulation point is configured to occupy a first position when the at least one leaf is in the closed position and a second position when the at least one leaf is in the open position, the first position being at a greater distance from the inactive position than from the active position.

16. A platform cabin separator, comprising:
- at least one stationary partition, delimiting a passage defining a circulation axis within a cabin;
- at least one leaf, mounted movable along a plane transverse to the circulation axis between a closed position, in which the at least one leaf extends across the passage, and an open position, in which the at least one leaf is arranged at least partially away from the passage, the at least one leaf being subject to a return force toward the open position;
- for the at least one leaf, a return member for returning the at least one leaf toward the closed position, the return member comprising a first end articulated at an articulation point movable jointly with the at least one leaf, the return member comprising a second end mounted movably relative to the partition between an active position and an inactive position, such that:
  - when the at least one leaf is open and the second end is in the active position, the return member is in a working configuration in which the return member exerts, on the at least one leaf, a return force returning the at least one leaf toward the closed position, the return force toward the closed position being greater than or equal to the return force toward the open position, and
  - when the at least one leaf is open and the second end is in the inactive position, the return member is in a second configuration in which the return member does not exert a force returning the at least one leaf toward its closed position, or in which the return member exerts a residual return force less than or equal to the return force toward the open position; and
- a motorized main actuator to move the second end of the return member between the active and inactive positions,
- wherein the main actuator is configured to move the second end of the return member between the active and inactive positions along a substantially rectilinear path.

* * * * *